United States Patent [19]
Kumagai

[11] Patent Number: 5,228,097
[45] Date of Patent: Jul. 13, 1993

[54] METHOD FOR REGISTERING IMAGE DATA

[75] Inventor: Ryohei Kumagai, Tokyo, Japan
[73] Assignee: Ezel, Inc., Tokyo, Japan
[21] Appl. No.: 821,865
[22] Filed: Jan. 16, 1992

Related U.S. Application Data

[63] Continuation of Ser. No. 307,543, Feb. 7, 1989, abandoned.

[51] Int. Cl.⁵ .............................................. G06K 9/36
[52] U.S. Cl. ........................................ 382/56; 382/21; 382/22
[58] Field of Search ................... 382/21, 22, 25, 49, 382/54, 56

[56] References Cited

U.S. PATENT DOCUMENTS

| | | | |
|---|---|---|---|
| 3,942,169 | 3/1976 | Fujimoto et al. | 382/21 |
| 4,183,013 | 1/1980 | Agrawala et al. | 382/22 |
| 4,189,711 | 2/1980 | Frank | 382/22 |
| 4,524,454 | 6/1985 | Ejiri | 382/21 |
| 4,524,456 | 6/1985 | Araki et al. | 382/56 |
| 4,566,128 | 2/1986 | Araki | 382/56 |
| 4,653,107 | 3/1987 | Shojima et al. | 382/22 |
| 4,757,551 | 7/1988 | Kobayashi et al. | 382/21 |
| 4,763,119 | 8/1988 | Matsubara et al. | 340/728 |
| 4,773,098 | 9/1988 | Scott | 382/21 |
| 4,813,078 | 3/1989 | Fujiwara et al. | 382/21 |
| 4,833,721 | 5/1989 | Okutomi et al. | 382/21 |
| 4,961,231 | 10/1990 | Nakagawa et al. | 382/21 |

OTHER PUBLICATIONS

Freeman, Computer Processing of Line-Drawing Images, Computing Surveys, vol. 6, No. 1, Mar., 1974.
Freeman, On the Encoding of Arbitrary Geometric Configurations, Ire Transactions of Electronic Computers Jun., 1961.
Rosenfeld and Kak, Digital Picture Processing, Computer Science and Applied Mathematics, 1976, pp. 4-5 pp. 369-379.
Rosenfeld and Kak, Digital Picture Processing, Computer Science and Applied Mathematics, 1982, pp. 197-199.

Primary Examiner—Jose L. Couso
Attorney, Agent, or Firm—Cushman, Darby & Cushman

[57] ABSTRACT

A method for storing information defining a configuration in an image scans an image, and distinguishes a background density level from a density level of the configuration. For scan lines, start pixels are identified as the first of a contiguous group of pixels having the configuration density encountered in the direction of a scan, and end pixels are identified as the last of a contiguous group of pixels having the configuration density. Chain codes are generated linking start and end pixels among differing scan lines, and start and end pixels are also indexed. Chain codes and indexes are stored as image representations.

21 Claims, 3 Drawing Sheets

| $Y_1$ | $S(1,1), S(1,2), \cdots, S(1,k)$ | $E(1,1), \cdots, E(1,\ell)$ |
|---|---|---|
| $Y_2$ | — — — — — — — — — | — — — — — — — |
| — — | — — — — — — — — — | — — — — — — — |
| $Y_n$ | $S(n,1), S(n,2), \cdots, S(n,i)$ | $E(n,1), \cdots, E(n,j)$ |

METHOD FOR REGISTERING IMAGE DATA

This is a continuation of application Ser. No. 07/307,543, filed on Feb. 7, 1989, which was abandoned upon the filing hereof.

FIELD OF THE INVENTION

The present invention relates to a method for registering image data.

BACKGROUND OF THE INVENTION

Image data to be registered is classified into two types; one is the raster type consisting of density data of each pixel; the other is the vector type consisting of vector data following the contour of a configuration. A compacting method is also proposed. The run length method is one compacting method. These types of data are selected according to the usage of the data. A new type of data is proposed by the invention of the present invention using Freeman's chain code.

For inputting image data, an image scanner is usually used. The image scanner generates raster data and has problems of long input time because of immense amounts of data. It takes a long time to process data outputted from an image scanner.

SUMMARY OF THE INVENTION

The present invention has an object to provide a method for registering image data which is effective for high speed image input and reconstruction.

According to the method of the present invention, the end points of each line included in a configuration are extracted and registered.

PREFERRED EMBODIMENT OF THE PRESENT INVENTION

Hereafter, exemplary preferred embodiments of the present invention are described in detail.

Figure 1:
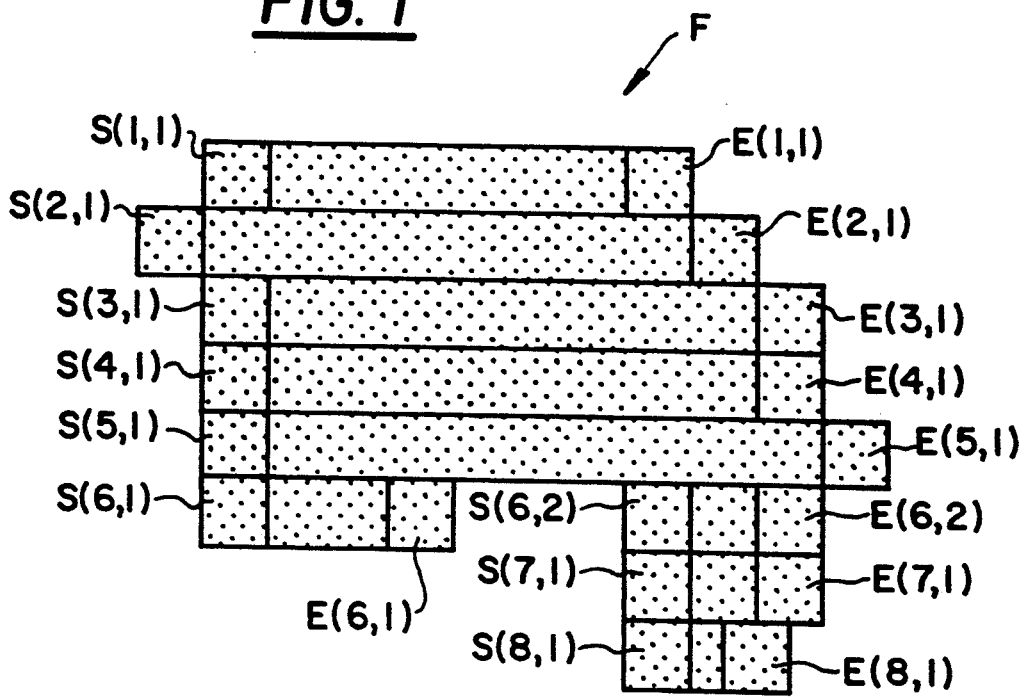
FIG. 1 shows a configuration registered according to the embodiment of the present invention.

FIG. 1 shows a configuration F consisting of 8 scan lines. On each of the scan lines, there exists at least one pixel from which the density of the pixel is the density, of the configuration, while the previous pixel has the background density. Such a pixel is called the "start pixel" hereinafter. Similarly, on each of the scan line, there exists at least one pixel for which the density of the pixel is the configuration density, while the following pixels have the background density. Such a pixel is called the "end pixel" hereinafter.

In FIG. 1, start pixels are defined by references S(i, j) for i-th scan line as well as j-th start pixel on i-th scan line. End pixels are defined by references E(i, j) for i-th scan line as well as j-th end pixel on i-th scan line. On the first scan line, a start pixel S(1, 1) and an end pixel E(1, 1) exist. While on the sixth scan line, a start pixel S(6, 1) as well as end pixels E(6, 1) and E(6, 2) exist.

When an image is read by an image scanner, it is effective for improving the reading speed that only start and end pixels are detected rather than detecting all pixels. For reconstructing the original image, corresponding start and end pixel are connected by a line. This connection is usually performed in short time, and performed in extremely high speed by a graphic processor.

Furthermore, Freemen's chain code or similar direction code can be generated easily from data consisting of start and end pixels.

Chain code can be given to a configuration in a clockwise or anticlockwise direction. In the following description, an anticlockwise direction is applied. Those ordinarily skilled in the art will easily understand clockwise chain code generation from the following description.

Figure 2A:
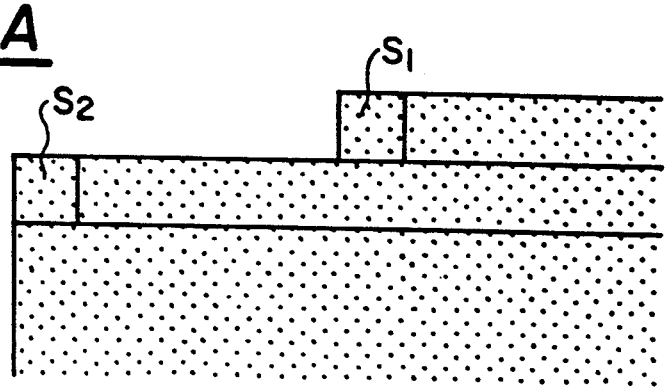
FIGS. 2 (1) to (3) show three types of configurations from which chain code trains are generated.
Figure 2B:
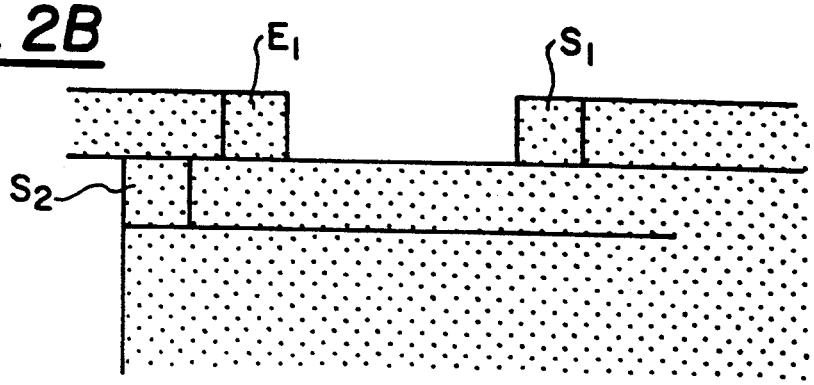
Figure 2C:
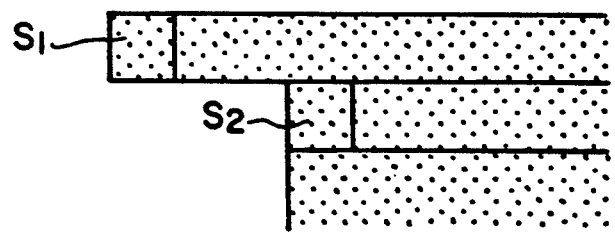

In FIG. 2, the first and second scan lines are shown. For generating the chain code, the next pixel to be indicated by a chain code given to the previous pixel should be found.

In FIG. 2 (1), a start pixel S1 on the first scan line and a start pixel S2 on the second scan line are shown. The pixel S2 exists leftward from the pixel S1, there is no end pixel between S1 and S2. In this case, the pixel S2 is to be traced as a top or end pixel following the pixel S1. Between the pixels S1 and S2, pixels on the second scan line are traced. So the pixel S1 is given a chain code "5", the lower left pixel is given a chain code "4", from its lower left pixel to the previous pixel to the pixel S2, all pixels are given chain code of "4".

In FIG. 2 (2), there exists an end pixel E1 between the start pixels S1 and S2. In this case, the end pixel E1 is to be traced following the pixel S1. The start or end pixel to be traced after the pixel E1 is the leftward start pixel (not shown) corresponding to the end pixel E1. Chain code of "5" is given to the pixel S1, a chain code train of "4, 4, ..., 4, 3" is given to pixels between the pixels S1 and E1.

In FIG. 2 (3), a start pixel S2 exists rightward of a start pixel S1. The start or end pixel to be traced following to the start pixel S1 is the start pixel S2. A chain code train of "0, 0, ..., 0, 7" is given to pixels between pixels S1 and S2. In the processes above in FIG. 2, scan line are traced downwardly. While in the processes in FIG. 3, scan line are traced upwardly.

Figure 3A:
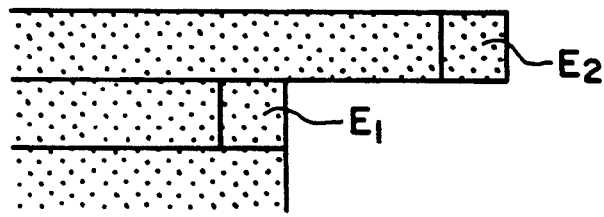
FIGS. 3 (1) to (3) show three types of configurations from which chain code trains are generated in reverse direction from that of the chain in FIG. 2.
Figure 3B:
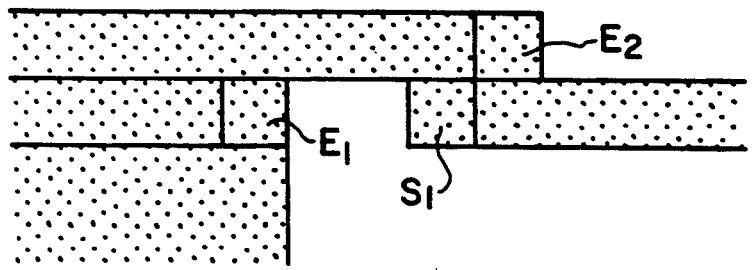
Figure 3C:
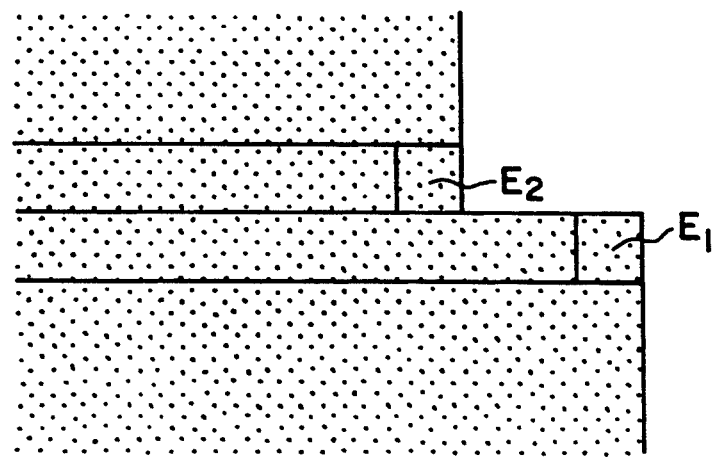

In FIG. 3 (1), a end pixel E2 exists rightward from an end pixel on the previous scan line. The end pixels E1 and E2 are last end pixels; no pixels exist in the rightward area of the pixels E1 and E2. Furthermore, no start pixel exists between the pixels E1 and E2. The start or end pixel to be traced following to the end pixel E1 is the pixel E2. A chain code of "1" is given to the pixel E1 and a chain code train of "0, 0, ..." is given to pixels between pixels E1 and E2.

FIG. 3 (2), between the pixels E1 and E2 on the scan line similar to that of the pixel E1, a start pixel S1 exists. In this case, a start or end pixel to be traced after the end pixel E1 is the start pixel S1. After the end pixel E2, the start pixel corresponding to the end pixel E2 is to be traced as a start or end pixel. A chain code "1" is given to the end pixel E1. To the pixels between the end pixel E1 and start pixel S1, a chain code train of "0, 0, ..., 7" given.

In FIG. 3 (3), there exist end pixels E1 and E2 which is rightward from the end pixel E1. The end pixel E2 is positioned on a scan line next to the scan line to which the end pixel E1 belongs. In this case, a start or end pixel to be traced next to the end pixel E1 is the end Pixel E2. A chain code "4" is given to the end pixel E1. A chain code train of "4, 4, ..., 3" is given to the pixels between the end pixels E1 and E2.

Figures 4, 5:
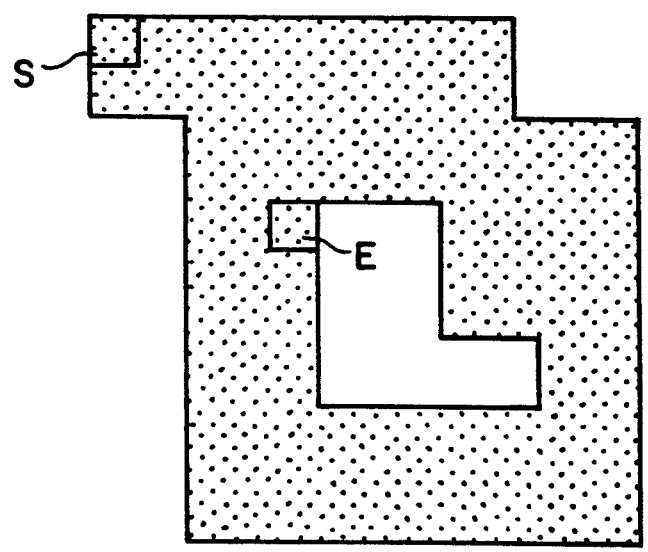
FIG. 4 shows start points of chain code trains along inner and outer contours of a configuration.
FIG. 5 is a table showing data registered according to the embodiment of the present invention.

A chain code train is given to each connected configuration so as to define a closed loop. The start point of the chain code train is the pixel from which the scan line enters in the configuration. The start point cannot be other pixels than a start or end pixel. When the start point is a start pixel, a chain code train defines the outer peripheral of a configuration. When the start point is a end pixel, a chain code train defines the inner peripheral of a configuration. FIG. 4 shows such start pixel S and end pixel E. The start point is important for vectorizing etc.

FIG. 5 shows a table for storing configuration data by start and end pixels. Each raster is represented by y-coordinate such as y1, y2, ..., yn. In each row representing a scan line, x-coordinates representing start or end pixels are storaged.

When a chain code train is generated, a co-ordinate which is given a chain code is indicated by an index. The end of a chain code train is found, when a indexed coordinate (pixel) is traced. The next chain code train is generated from a pixel whose coordinate is not indexed. An unindexed pixel is usually a pixel existing on a more upper scan line and more leftward on the scan line.

For indicating the start point of a chain code train, the coordinate itself may be registered.

Though the modification or substitution may possible in various way concerning to the present invention, some special embodiments are constructed and described in detail. It is not intended to limit this invention in a special form or condition described, but to conclude any variation, substitutions and equivalents within the spirit of the present invention defined in claims.

What is claimed is:

1. A method for storing a representation of a configuration in an image having more than two scan lines comprising steps of:
generating an electronic pixel representation of a first scan line of the image;
generating an electronic pixel representation of a second scan line of the image, the second line being contiguous with the first line;
for the pixel representation of the first scan line, identifying a first start pixel as a first of a contiguous group of pixels along the scan line having a configuration density, and identifying a first end pixel as a last of a contiguous group of pixels along the scan line having a configuration density;
for the pixel representation of the second scan line, identifying a second start pixel as a first of a contiguous group of pixels along the scan line having a configuration density, and identifying a second end pixel as a last of a contiguous group of pixels along the scan line having a configuration density;
electronically generating chain codes connecting selected start and end pixels according to the positions of the first and second end pixels relative to the first and second start pixels, wherein the chain codes connect the selected start and end pixels with straight line segments of a predetermined length and direction code; and
storing the generated chain codes as a representation of the configuration in the image.

2. A method as in claim 1 wherein: the image is scanned in a raster scan order; and scan lines are sequentially processed in the order scanned.

3. A method as in claim 2 wherein the step of generating chain codes includes a step of generating codes connecting the first start pixel to the second start pixel when the second start pixel is less advanced in the second scan line than is the first start pixel in the first scan line, and the first scan line contains no end pixel which is both:
less advanced in the first scan line than is the start pixel first scan line; and
more advanced in the first scan line than is the start pixel in the second scan line.

4. A method as in claim 2 wherein the step of generating chain codes includes a step of generating codes connecting the first start pixel to the first end pixel when:
the first end pixel is less advanced in the first scan line than is the first start pixel; and
the second scan line contains a start pixel which is less advanced in the second scan line than is the first end pixel in the first scan line.

5. A method as in claim 2 wherein the step of generating chain codes includes a step of generating codes connecting the first start pixel to the second start pixel when the first start pixel is less advanced in the first scan line than is the second start pixel in the second scan line, and the second scan line contains no end pixel which is both:
less advanced in the second scan line than is the first start pixel in the second scan line; and
more advanced in the second scan line than is the first start pixel in the first scan line.

6. A method as in claim 1 wherein:
the image is scanned in a raster scan order;
scan lines are sequentially processed in the reverse order of the scanning order.

7. A method as in claim 6 wherein the step of generating chain codes includes a step of generating codes connecting an end pixel in the first line to an end pixel in the second scan line when the end pixel in the second scan line is more advanced than the end pixel in the first scan line.

8. A method as in claim 6 wherein the step of generating chain codes includes a step of generating codes connecting a start pixel and an end pixel on the first scan line when:
the start pixel is more advanced than the end pixel; and
the second scan line contains an end pixel which is more advanced than the start pixel in the first scan line.

9. A method as in claim 6 wherein the step of generating chain codes includes a step of generating codes connecting an end pixel of the first scan line to an end pixel of the second scan when the end pixel of the following pixel is less advanced than the end pixel in the first line; and no start pixel exists on the second scan which is both:
less advanced than the end pixel in the first scan line; and
more advanced than the end pixel in the second scan line.

10. A method as in claim 1 wherein, the step of generating a chain code includes a step of generating a chain code advancing in a clockwise direction around the configuration.

11. A method as in claim 1 wherein the step of generating a chain code includes a step of generating a chain code advancing in an anti-clockwise direction around the configuration.

12. A method for defining an external periphery of a configuration according to claim 1 wherein the chain code begins at a start pixel of a scan.

13. A method for defining an internal periphery of a configuration according to claim 1 wherein the chain code begins at an end pixel of a scan.

14. A method as in claim 10 wherein:
the image is scanned in a raster scan order;
scan lines are sequentially processed in the reverse order of the scanning order.

15. A method as in claim 14 wherein the step of generating chain codes includes a step of generating codes connecting the first start pixel to the second start pixel when the first start pixel is less advanced in the first scan line than is the second start pixel in the second scan line, and the second scan line contains no end pixel which is both:
more advanced than the first start pixel of the first scan line; and
less advanced than the second start pixel in the second scan line.

16. A method as in claim 14 wherein the step of generating chain codes includes a step of generating codes connecting the second end pixel to the second start pixel when:
the second end pixel is less advanced than the second start pixel; and
the first scan line contains a start pixel which is less advanced in the first scan line than is the second end pixel in the second scan line.

17. A method as in claim 14 wherein the step of generating chain codes includes a step of generating codes connecting the first start pixel to the second start pixel when the first start pixel is more advanced in the first scan line than is the second start pixel in the second scan line, and the first scan line contains no end pixel which is both:
more advanced in the first scan line than is the second start pixel in the second scan line; and
less advanced in the first scan line than is the first start pixel in the first scan line.

18. A method as in claim 10 wherein:
the image is scanned in a raster scan order; and
scan lines are sequentially processed in the order scanned.

19. A method as in claim 18 wherein the step of generating chain codes includes a step of generating codes connecting the first end pixel to the second end pixel when the second end pixel is less advanced in the second scan line than is the first end pixel in the first scan line and the second scan line includes no start pixel which is both:
less advanced in the second scan line than is the first end pixel in the first scan line; and
more advanced in the second scan line than is the second end pixel in the second scan line.

20. A method as in claim 18 wherein the step of generating chain codes includes a step of generating codes connecting the second start pixel and the second end pixel when:
the second start pixel is more advanced in the second scan line than is the second end pixel; and
the first scan line contains an end pixel which is more advanced than the start pixel in the second scan line.

21. A method as in claim 18 wherein the step of generating chain codes includes a step of generating codes connecting the first end pixel and the second end pixel when the second end pixel is more advanced in the second scan line than is the first end pixel in the first line, and no start pixel exists in the first scan which is both:
more advanced in the first scan line than is the first end pixel in the first scan line; and
more advanced in the first scan line than is the second end pixel in the second scan line.

* * * * *